United States Patent [19]

Abernathy

[11] 4,435,837

[45] Mar. 6, 1984

[54] PATTERN RECOGNITION AND ORIENTATION SYSTEM

[75] Inventor: Frederick H. Abernathy, Auburndale, Mass.

[73] Assignee: President and Fellows of Harvard College, Cambridge, Mass.

[21] Appl. No.: 240,878

[22] Filed: Mar. 5, 1981

[51] Int. Cl.³ ............................................. G06K 9/32
[52] U.S. Cl. ...................................... 382/41; 112/275; 250/561; 356/375; 356/380; 356/394; 364/559; 364/564; 382/27; 382/45
[58] Field of Search ............... 340/146.3 H; 364/463, 364/470, 478, 515, 559, 560, 564; 358/101, 107; 356/152–153, 373, 375, 379–380, 399–400, 390–394, 398, 238; 250/548, 557, 561, 202; 270/58–59; 271/226–227; 112/275; 382/28, 41, 45

[56] References Cited

U.S. PATENT DOCUMENTS

| | | | |
|---|---|---|---|
| 2,354,767 | 8/1944 | Nokes | 356/380 |
| 3,207,904 | 9/1965 | Heinz | 250/202 |
| 3,292,148 | 12/1966 | Giuliano et al. | 382/41 |
| 3,378,257 | 4/1968 | Boynton et al. | 271/84 |
| 3,409,780 | 11/1968 | Fargo et al. | 356/398 |
| 3,457,422 | 7/1969 | Rottmann | 250/548 |
| 3,544,098 | 12/1970 | Hawley et al. | 270/58 |
| 3,598,978 | 8/1971 | Rempert | 250/548 |
| 3,670,153 | 6/1972 | Rempert et al. | 250/548 |
| 3,846,755 | 11/1974 | Hart | 382/27 |
| 3,854,822 | 12/1974 | Altman et al. | 356/394 |
| 4,105,925 | 8/1978 | Rossol et al. | 356/375 |
| 4,147,930 | 4/1979 | Browne et al. | 250/202 |
| 4,201,378 | 5/1980 | Hams | 250/561 |
| 4,203,064 | 5/1980 | Suzuki et al. | 250/561 |
| 4,219,847 | 8/1980 | Pinkney et al. | 364/559 |
| 4,360,274 | 11/1982 | Norton-Wayne | 356/394 |

FOREIGN PATENT DOCUMENTS 974328  9/1975  Canada ................................ 364/559

Primary Examiner—Leo H. Boudreau

[57] ABSTRACT

A system that automatically scans the shape of a flat object located in a viewing field, recognizes the shape by identifying at least one moment (e.g., the first moment, area; the second moments, products of inertia; or a higher moment), calculates the centroid and angle of inclination of a principal axis, and then moves the object to a desired location and into a desired orientation.

4 Claims, 3 Drawing Figures

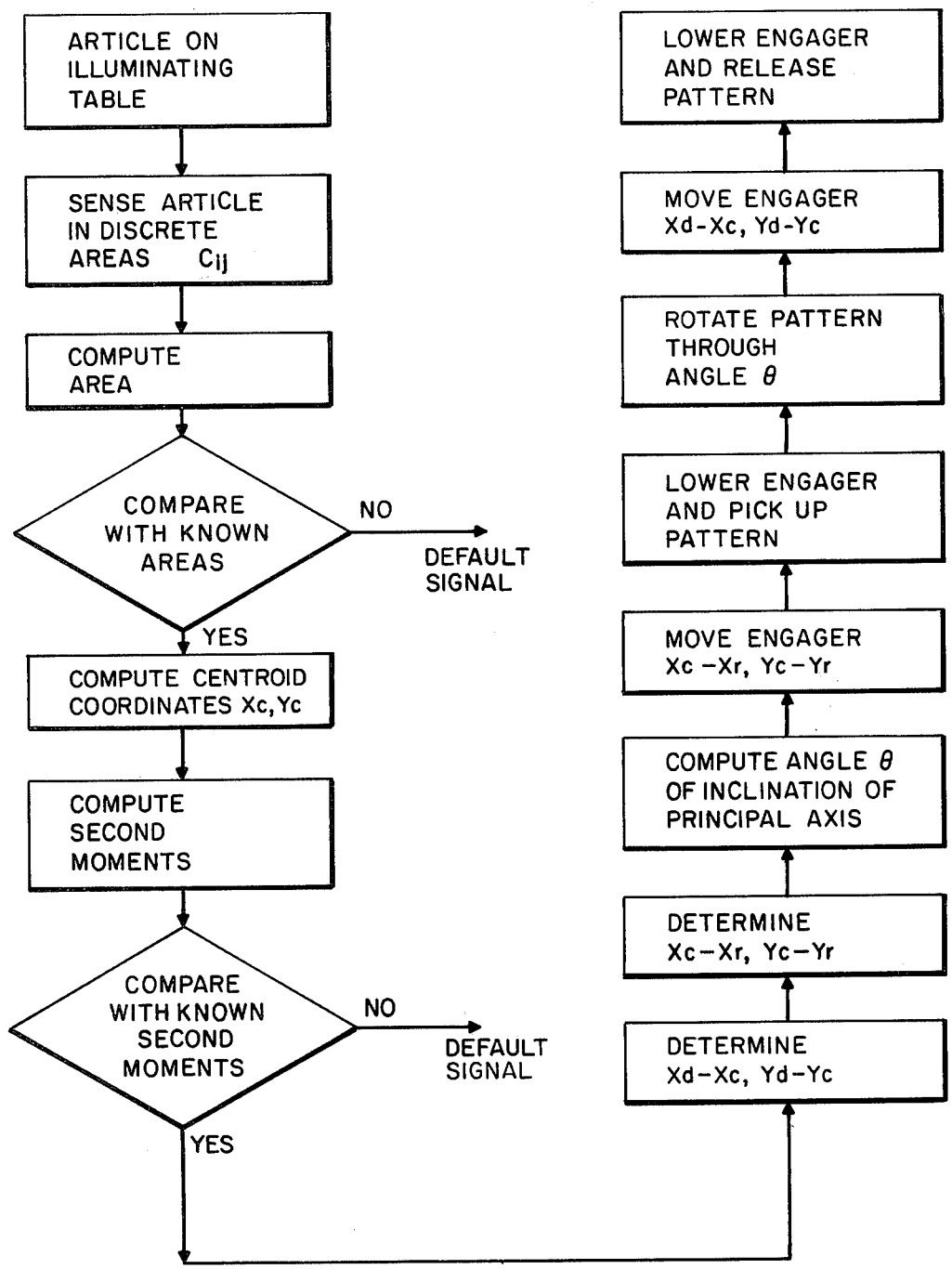

PATTERN RECOGNITION AND ORIENTATION SYSTEM

The invention described herein was made in the course of work under grants and awards from the National Science Foundation.

This invention relates to the automatic positioning of flat articles, and in particular, the positioning of cut pieces of cloth in the manufacture of clothing or cut pieces of paper, sheet metal or plastic for subsequent use.

In the manufacture of clothing, cloth is stacked in many layers, and individual pieces are then cut to the desired shape of a particular pattern. Pieces from a number of such stacks are then positioned together and joined. In conventional clothing manufacturing operations, most of the positioning of the pieces of cloth is done by human operators using visual alignment. Prior attempts to automatically position the cloth pieces have involved pushing the material against a mechanical stop (e.g., Hawley et al. U.S. Pat. No. 3,544,098) or detecting the location of an edge (e.g., Boynton et al. U.S. Pat. No. 3,378,257).

An object of the invention is to provide a system for automatically recognizing the shapes and orientations of flat articles and then positioning them.

Another object of the invention is to position cloth pieces without deforming the cloth.

Accordingly, the present invention provides a system to automatically scan the shape of a flat object located in a viewing field, recognize the shape by identifying at least one moment (e.g., the first moment, area; the second moments, products of inertia; or a higher moment), calculate the centroid and angle of inclination of a principal axis, and then move the object to a desired location and into a desired orientation. In preferred embodiments the object is moved by positioning apparatus that picks up the object and travels along two axes in a horizontal direction, rotates the object about its centroid and lowers the object into its desired position and orientation; a photoelectric scanner is used to view the shape of the object; and vacuum suction means are used to engage the article.

Other objects, features, and advantages will appear from the following description of the preferred embodiment of the invention, taken together with the drawings, in which:

FIG. 3 is a flow diagram describing a method of recognizing the shape of a flat object and positioning it according to the invention.

Figure 1:
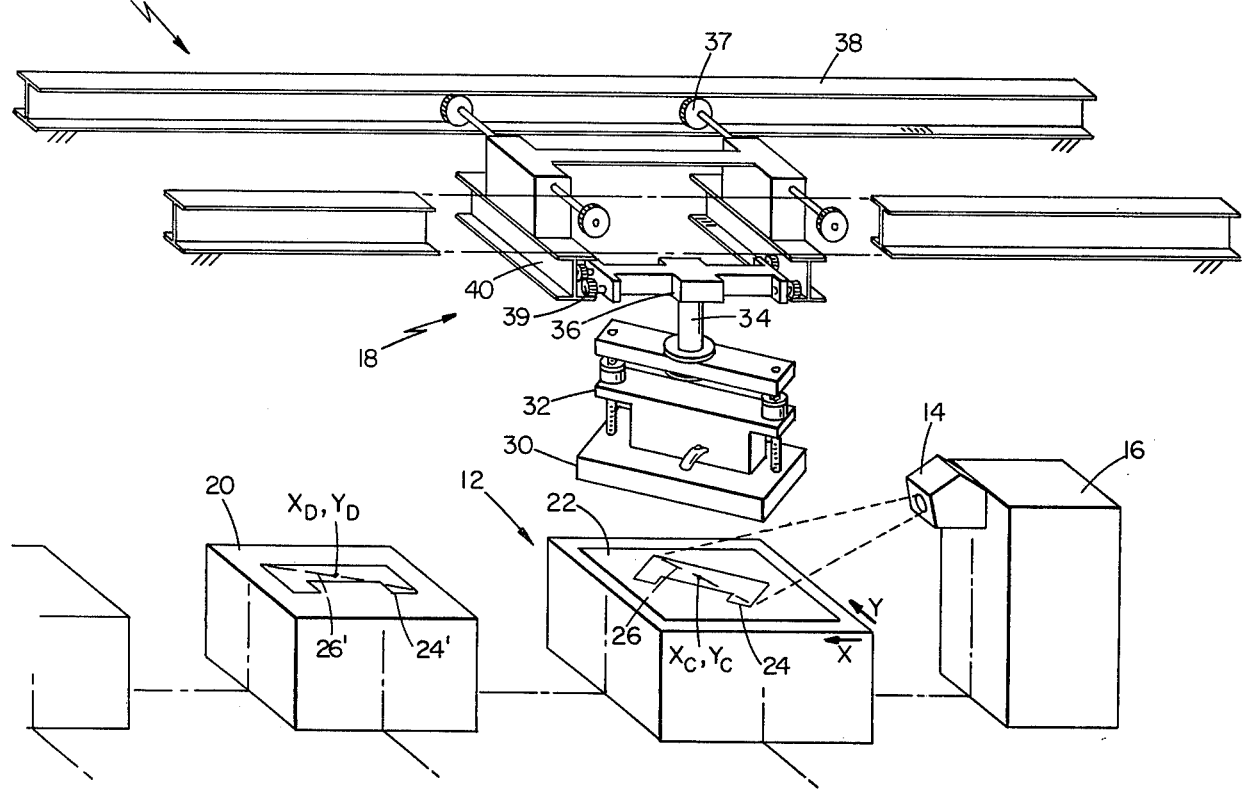
FIG. 1 is a diagrammatic perspective view of a shape recognition and article positioning system according to the invention.

Referring to FIG. 1 there is shown a shape recognition and positioning system 10 comprising illuminating table 12, photoelectric viewer 14, controller 16, positioning apparatus 18, and work station 20. Table 12 has a flat transparent surface 22, a light source therebeneath (not shown), and an X and Y axis associated with it. On surface 22 is shown clothing piece 24 having centroid coordinates $X_c$, $Y_c$ and a principal axis 26. An identical piece 24' is shown on work area 20 with its centroid aigned with coordinates $X_d$, $Y_d$ and principal axis 26' aligned in a desired orientation. Positioning apparatus 18 has vacuum box 30 with a flat lower surface having the plurality of small holes therethrough which communicate with a vacuum source (not shown) controlled by controller 16. Box 30 can be raised and lowered by apparatus 32, and it can be rotated about shaft 34, having an axis with coordinates $X_r$, $Y_r$, by rotator 36. Box 30 can travel in both the X and Y direction by travel of rollers 37, 39 along I beams 38, 40, respectively. The travel of box 30 in all three directions and its rotation are controlled by controller 16.

Figure 2:
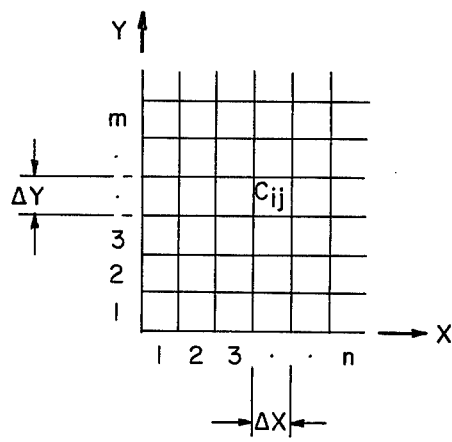
FIG. 2 is a diagram showing a scanning matrix used in viewing said article.

FIG. 2 shows an X by Y matrix (m=1000, n=1000) corresponding to both discrete areas ($\Delta x$ by $\Delta y$) on surface 22 and an array of optical cells within viewer 14.

Each cell or discrete area $c_{ij}$ can be identified by two subscripts i and j, where i is the row and j the column designation. The viewer is constructed so that the existence of a dark cell causes a digital signal indicating the existence of a portion of article in a discrete area in the field of view. From these signals the area (A), centroid coordinates ($X_c$, $Y_c$), the second moments of inertia ($I_{xx}$, $I_{yy}$), the cross-product of inertia ($I_{xy}$), and the angle ($\theta$) of the inclination of the X or Y axis to the principal axis through the centroid of the article are determined by controller 16 (e.g., microprocessor) by techniques well known in the art using the following standard definitions:

$$A = \sum_{i=1}^{m} \sum_{j=1}^{n} c_{ij} \Delta x \Delta y;\ \Delta x \Delta y = dA$$

$$x_c = \frac{\sum_{j=1}^{n} \left[ j\Delta x \sum_{i=1}^{m} C_{ij} dA \right]}{A}$$

$$y_c = \frac{\sum_{i=1}^{m} \left[ i\Delta y \sum_{j=1}^{n} C_{ij} dA \right]}{A}$$

$$I_{xx} = \sum_{j=1}^{n} \left\{ (j\Delta x - x_c)^2 \sum_{i=1}^{m} C_{ij} dA \right\}$$

$$I_{yy} = \sum_{i=1}^{m} \left\{ (i\Delta y - y_c)^2 \sum_{j=1}^{n} C_{ij} dA \right\}$$

$$I_{xy} = \sum_{j=1}^{n} \sum_{i=1}^{m} (i\Delta y - y_c)(j\Delta x - x_c) C_{ij} dA$$

$$\theta = \tfrac{1}{2} \operatorname{arctangent}\left( \frac{-2I_{xy}}{I_{xx} - I_{yy}} \right)$$

Referring to FIG. 3, the operation of system 10 will be described. In operation article 24 is placed on table 12 with its principal axis 26 within 45 degrees of the desired orientation 26', and it is viewed by viewer 14. Controller 16 will then determine the area of article 24 and compare it with the area of the desired piece. If the area does not correspond, controller 16 generates a default signal to indicate that. It should be noted that the step of area comparison can generate a default signal if a desired article is accidentally folded or pleated at the time of viewing so that its apparent area, as seen by the viewer, is different from the desired piece, as well as when the true area differs from that desired. This is a desirable feature in that it ensures that the article is flat and unfolded at the time it is positioned. If the area does correspond to the desired area, the centroid coordinates $X_c$, $Y_c$, and the moments and products of inertia $I_{xx}$, $I_{yy}$, and $I_{xy}$ are determined, and the total of $I_{xx}+I_{yy}$ is compared with the sum of the products of inertia of the desired piece. If these sums do not agree within certain limits, controller 16 generates an appropriate default signal. Otherwise the angle of inclination of the principal axis is determined along with the differences $X_d$-$X_c$, $Y_d$-$Y_c$, $Y_c$-$X_r$, and $Y_c$-$Y_r$. Controller 16 will then cause the axis $X_r$, $Y_r$ of shaft 34 to be aligned with $X_c$, $Y_c$ by moving box 30 $X_c$-$X_r$, and $Y_c$-$Y_r$ along beams 38, 40, box 30 to be lowered, and the vacuum source activated. When box 30 contacts piece 24, it will be attached thereto, and box 30 is then raised by apparatus 32 and moved along beams 38, 40, by distances $X_d$-$X_c$ and $Y_d$-$Y_c$, respectively. This places the centroid of article 24 over coordinates $X_d$, $Y_d$, and mechanism 36 then causes box 30 to rotate through angle $\theta$ plus the angle between the X or Y axis and axis 26', resulting in principal axis 26 being in a desired orientation (i.e., 26'). Mechanism 32 then causes box 30 to be lowered on to work area 20 and the vacuum source to be deactivated, resulting in disengagement of work piece 24 (24' in FIG. 1).

Other embodiments of the invention will be obvious to those in the art. For instance other viewers such as a matrix of air switches or contact switches on table 12 can be used to determine the existence of article 24 over discrete portions of the table. Also, the invention can be used with other flat objects in addition to cloth, the area alone or higher (i.e., 3rd, 4th etc.) moments of inertia could be used to recognize shapes, a number of such systems could be used together to align a number of different pieces of cloth at a common station, a single system could be used to feed a number of work stations, and positioning could be carried out by different apparatus.

Also, the system described above requires that the article 24 be placed within 45 degrees of the desired orientation. This is because with a 90 degree rotation of article 24, there is no change in the cross-product of inertia, $I_{xy}$. This placement limitation can be avoided by incorporating other principal axis identification procedures. For example, the shape can be broken into quadrants divided by the principal axis and an axis that is perpendicular to the principal axis and passes through the centroid, and the areas within each quadrant can then be calculated and compared with known values to determine which axis $\theta$ pertains to. Alternatively, the locations of the intersection, relative to the centroid, of the principal axis with the perimeter of the image can be compared with those of the desired orientation.

What is claimed is:

1. A method for recognizing a flat piece of cloth comprising
    placing said piece on a viewing surface within a field of interest having perpendicular coordinate axes,
    generating image signals corresponding to the existence or nonexistence of said piece in discrete areas of said field,
        said discrete areas being arranged in rows and columns along said axes,
        processing said image signals to obtain observed moment signals representative of the first (area) and the second (sum of the products of inertia $I_{xx}$, $I_{yy}$) moments of said piece,
    generating desired signals for the corresponding first and second moments of a desired piece,
    identifying said piece by comparing said observed moment signals with said desired moment signals, and
    generating a default signal when a difference between said observed and desired signals exceeds a certain limit.

2. The method of claim 1 including the additional steps, carried out when no default signal is generated, comprising
    processing said image signals to obtain signals representative of the angle between the principal axis of said piece and one of said field axes, and
    moving said piece to a desired location in response to the last said signals.

3. Clothing manufacturing apparatus for recognizing a flat piece of cut cloth placed within a field of interest having perpendicular coordinate axes, said apparatus comprising
    a member having flat viewing surface for supporting said piece,
    a viewer to generate image signals corresponding to the existence or nonexistence of said piece in discrete areas of said field,
        said discrete areas being arranged in rows and columns along said axes,
    means to process said image signals to obtain observed moment signals representative of the first (area) and the second (sum of the products of inertia $I_{xx}$, $I_{yy}$) moments of said piece,
    means to generate desired signals for the corresponding first and second moments of a desired piece, and
    means to generate a default signal when a difference between said observed and desired signals exceeds a certain limit.

4. Apparatus as claimed in claim 3 including
    further processing means, operative when no default signal is generated, to obtain signals representative of the the angle between the principal axis of said piece and one of said field axes, and
    means responsive to the last signals to move said piece to a desired location.

* * * * *